June 11, 1940.  J. E. LOSHBOUGH  2,204,421
CLUTCH FOR PUNCH PRESSES
Filed Jan. 22, 1938   4 Sheets-Sheet 1

Inventor:
James E. Loshbough
By Brown, Jackson, Boettcher & Dienner
Att'ys.

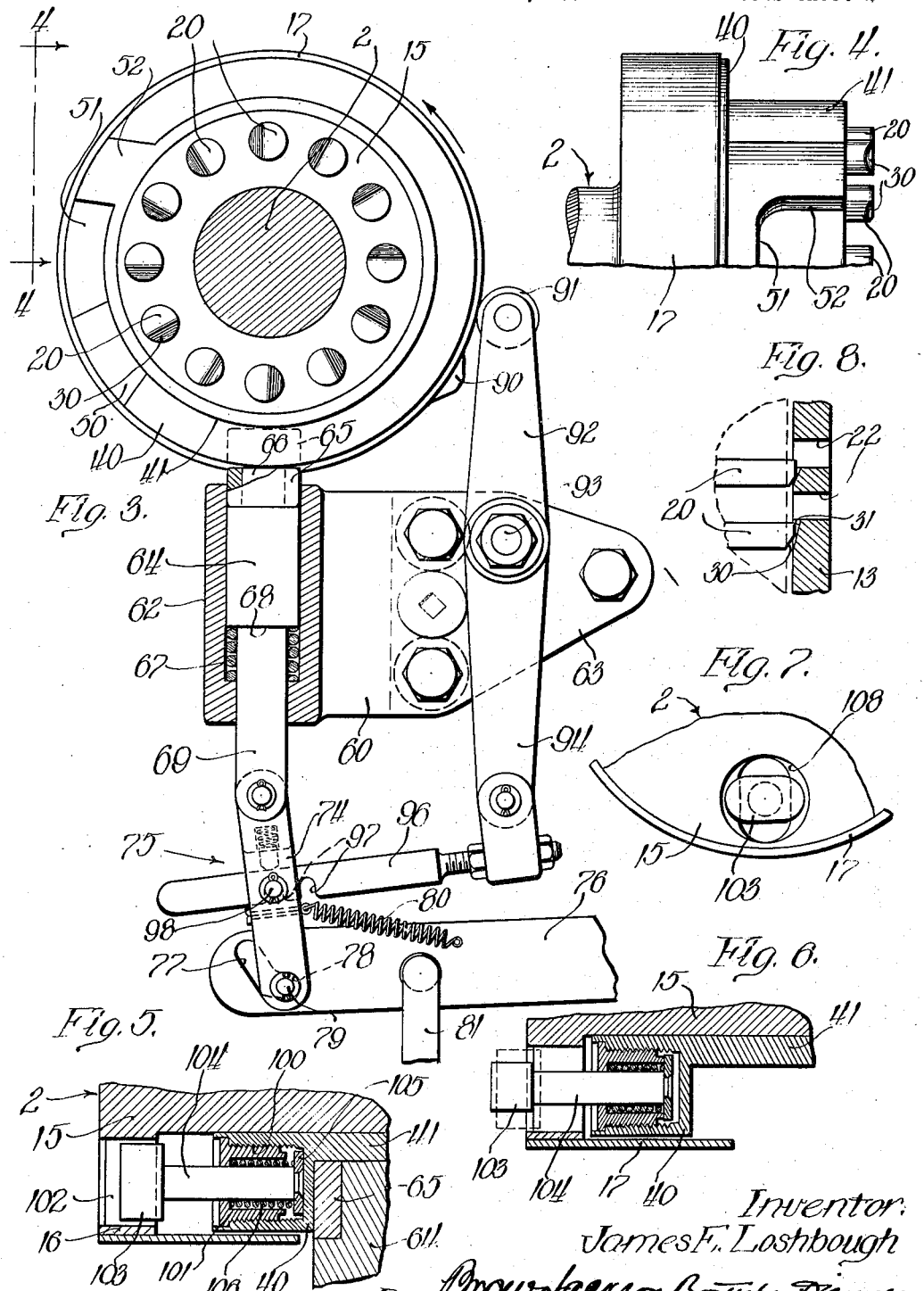

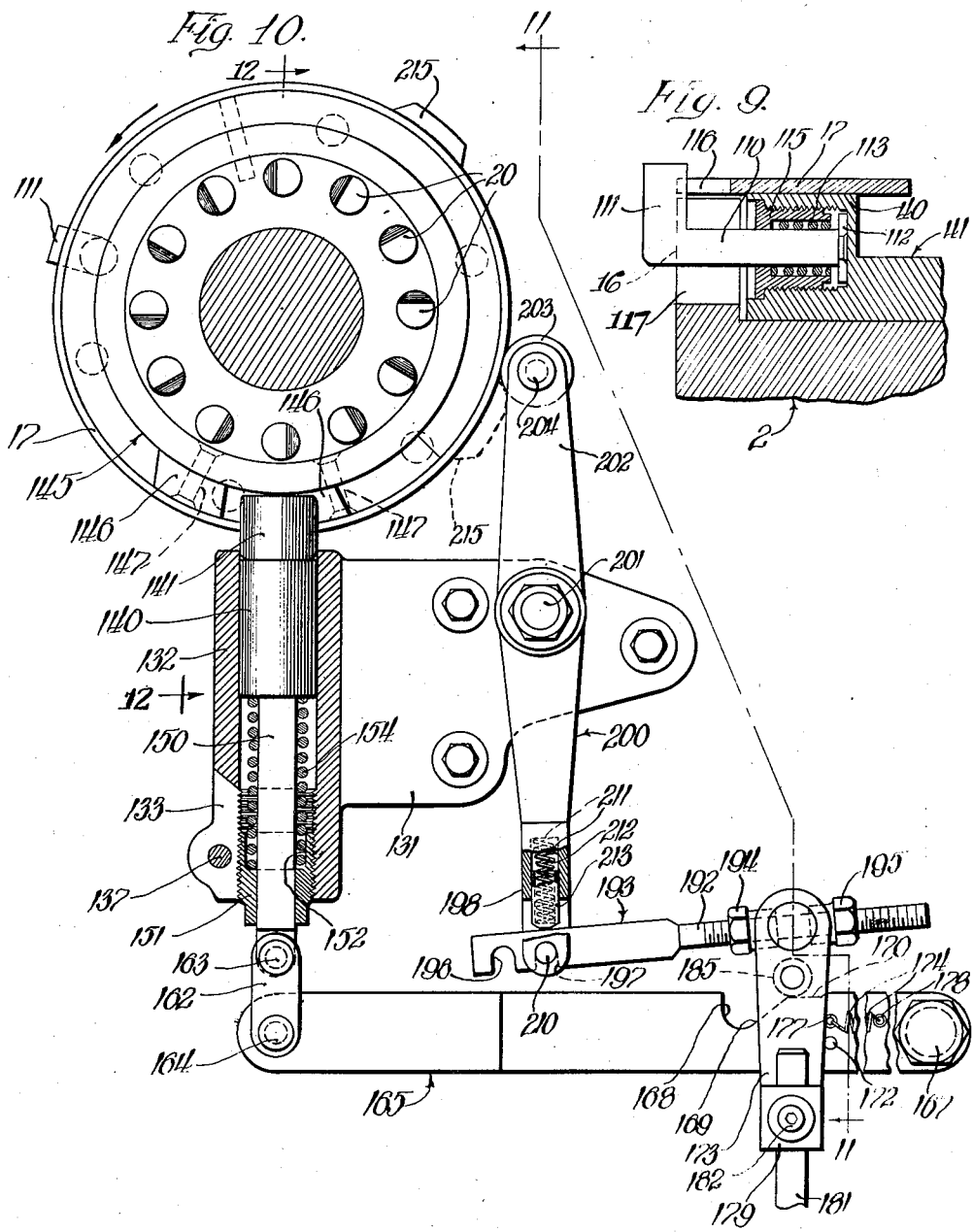

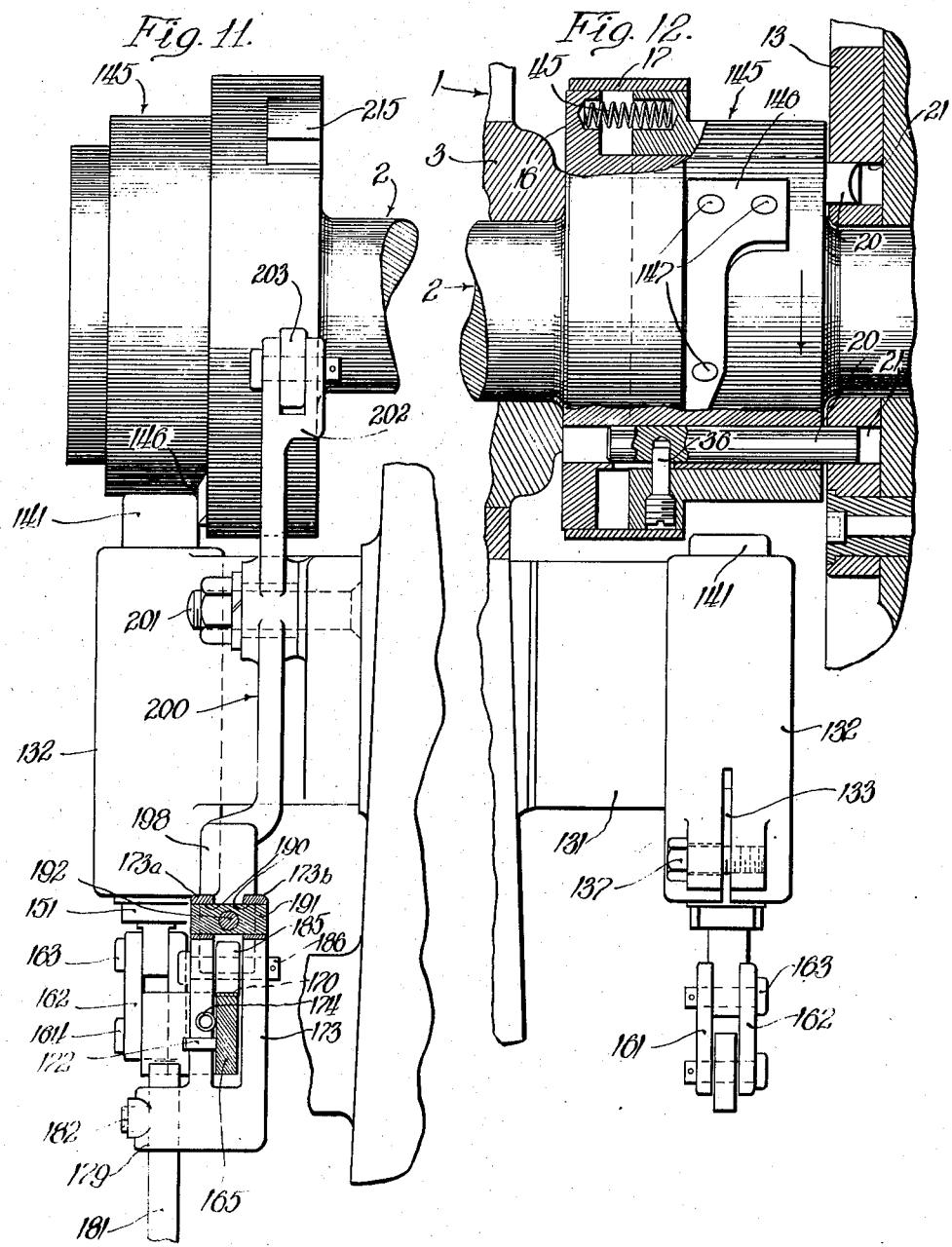

Patented June 11, 1940

2,204,421

UNITED STATES PATENT OFFICE 2,204,421

CLUTCH FOR PUNCH PRESSES

James E. Loshbough, Elkhart, Ind.

Application January 22, 1938, Serial No. 186,286

17 Claims. (Cl. 192—25)

This invention relates generally to punch presses, and more particularly to clutch mechanisms for punch presses and the like.

The principal object of my invention is the provision of clutch mechanism so constructed and arranged as to occupy a minimum amount of space between the frame of the press and the power driven flywheel which the clutch mechanism controllably connects to the crank shaft of the press.

Another object is the provision of clutch mechanism which transmits the driving torque as directly as possible from the flywheel to the crank shaft upon which the flywheel is journaled.

A further object is the provision of a clutch which is very compact in both longitudinal and radial dimensions.

Further, another object is the provision of clutch mechanism which is particularly constructed so as to avoid expensive machining operations and in which the parts that are subjected to wear can be replaced simply and inexpensively. A further object of my invention in this connection is the provision of a clutch mechanism having a plurality of slidable pins which controllably engage in correspondingly spaced openings in a hardened metal plate carried by the driving flywheel. One advantage of this construction is that a multipoint connection between the driven crank shaft and the driving flywheel is attained but without expensive jaw clutch construction. Also, if a pin should break, it is necessary to replace only that pin, which can be done without dismantling the press, whereas in jaw clutches, if a tooth should break, the whole sleeve must be replaced. Further, a multiple pin clutch is better able to withstand the jars and shocks incident to the intermittent operation of a machine like a punch press than are clutch mechanisms that include short and relatively rigid jaw teeth, and can apply the driving force more direct from the flywheel to the driven shaft than can be done with splines or other conventional sliding jaw clutches.

Another object is the provision of a clutch construction that includes a plurality of relatively long slidable pins carried by the crank shaft in long close-fitting bearings and controlled by a sliding collar or other means which is disposed about the pins in such a way that the length of the crank shaft required for the clutch is reduced to a minimum. Another object is the provision of a plurality of springs or the like which act against the clutch pins to throw the clutch into operation, but in which the thrust of the springs is evenly applied.

A further object of this invention is to provide new and improved means for positively holding the clutch mechanism disengaged. Still further, another object of this invention is the provision of a clutch in which all wearing parts are of simple and sturdy construction and can easily and inexpensively be replaced.

These and other objects and advantages of the present invention will be apparent to those skilled in the art after a consideration of the following detailed description taken in conjunction with the accompanying drawings.

In the drawings:

Figure 3 is a section taken generally along the line 3—3 of Figure 1 and shows one form of clutch release mechanism;

Figure 4 is a fragmentary view taken along the line 4—4 of Figure 3;

Figures 5 and 6 are enlarged sectional views showing two positions of the manually controlled means for positively locking the clutch in its released position;

Figure 7 is an end view of the manual lock shown in Figures 5 and 6;

Figure 8 is a circular section taken generally along the line 8—8 of Figure 1;

Figure 9 is a modified form of clutch lock;

Figure 10 is a view similar to Figure 3 but shows a modified form of clutch actuating mechanism;

Figure 11 is a view taken generally along the line 11—11 of Figure 10; and

Figure 12 is a fragmentary view taken generally along the line 12—12 of Figure 10.

Figure 1:
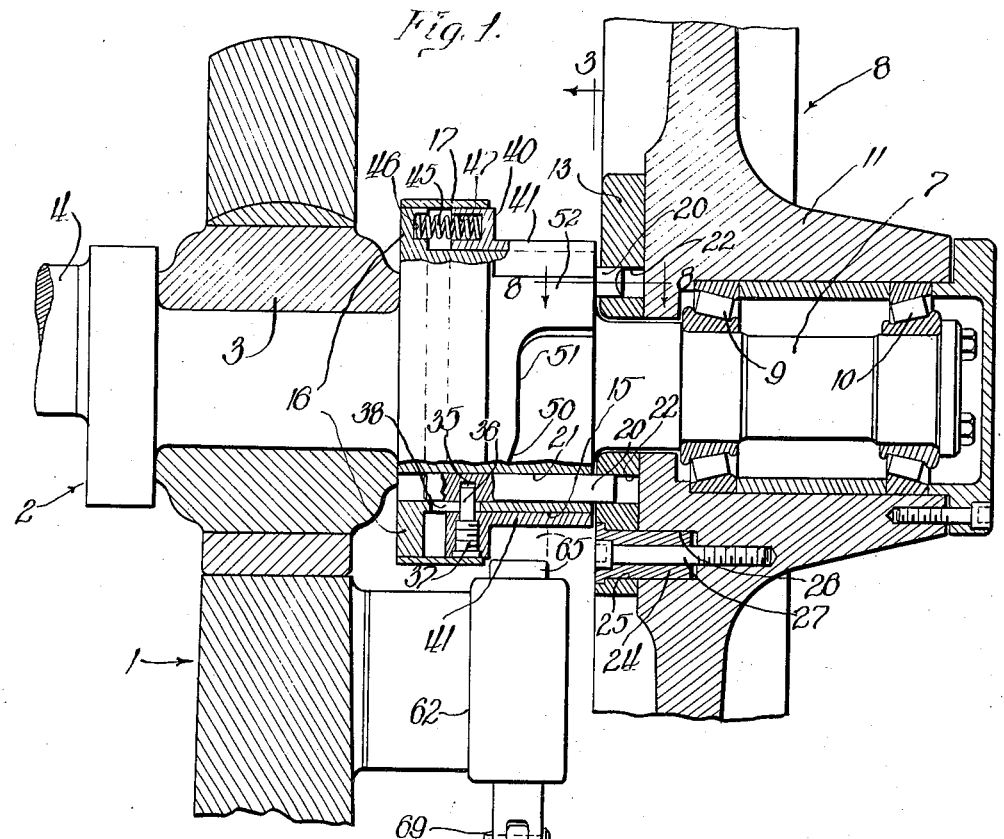
Figure 1 is a section taken through the clutch mechanism of a punch press constructed according to the principles of this invention.
Figure 2:
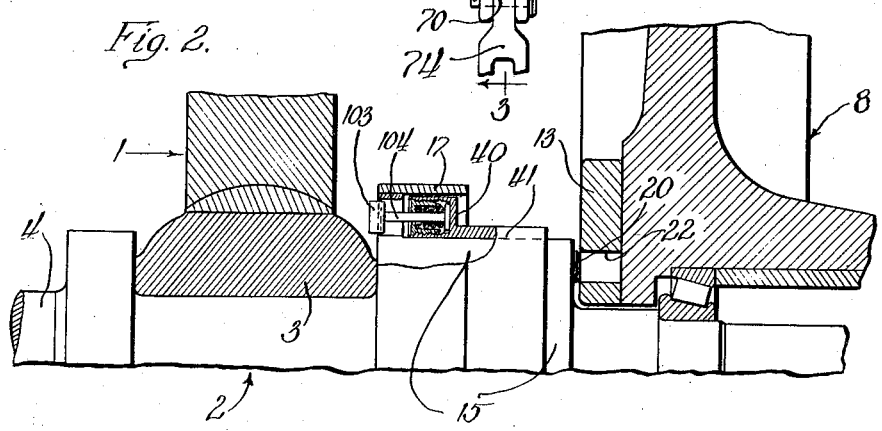
Figure 2 is a view similar to Figure 1 but showing the clutch mechanism in a released position.

Referring now to the drawings, and more particularly to Figures 1, 2, and 3, the press in which the present invention has ben incorporated includes a frame 1 and a crank shaft 2 journaled in the frame on suitable bearings 3. The crank shaft 2 includes a crank portion 4 to which the pitman of the press is connected in the usual manner. The end of the crank shaft 2 extends outwardly beyond the frame 1 a short distance, and has a reduced end 7 upon which a driving flywheel 8 is journaled in any suitable manner, as on roller bearings 9 and 10. The inner face of the hub 11 of the driving flywheel 8 is provided with an apertured clutch plate 13 which will be referred to later. The relatively short portion of the crank shaft between the frame bearings 3 and the inner face of the flywheel 8 is provided with an integral enlarged collar section 15 which is generally cylindrical in form and has a radially outwardly extending flange 16 upon which a ring 17 is fixed in any suitable manner.

The clutch mechanism for controlling the driving connection between the flywheel 8 and the crank shaft 2 is disposed in between the bearing sleeve and the inner face of the flywheel hub 11. The clutch mechanism includes a plurality of elongated axially extending pins 20 slidably disposed in bores 21 drilled in the circumferential portion of the collar section 15 of the crank shaft 2. These bores 21 can all be drilled at the same time with great rapidity and accuracy, and the bores 21 may extend entirely through the collar section 15 of the crank shaft or they may stop short of the inner face thereof, as desired. The hardened plate 13, mentioned above, is likewise provided with a plurality of bores 22 drilled therein with comparable accuracy, and the plate 13 is rigidly fastened to the inner face of the flywheel hub 11 by hardened bushings in the form of hollow dowel pins 24 disposed in circumferential apertures 25 and in recesses 26 formed in the inner flywheel hub, as best indicated in Figure 1. A dowel screw 27 passes inwardly through the central hole in the dowel pin 24 and is threaded into a tapped hole in the flywheel. The hardened bushings or dowel pins 24 take practically all of the stress in rigidly fastening the plate 13 in place, and the screws 27 serve principally to hold the bushings 24 in position. In the preferred construction, the peripheral spacing between the bores 22 corresponds practically exactly with the spacing between the pins 20, although, if desired, there may be twice as many holes 22 as there are pins 20 or some other ratio. It is essential, of course, that all of the pins can be projected into the drilled bores 22 to establish a driving connection between the flywheel 8 and the crank shaft 2 at a plurality of points about the axis of the crank shaft. As best indicated in Figures 3, 4 and 8, the outer ends of the pins 20 are beveled, as at 30, and, if desired, the portions of the plate 13 on the advancing sides of the bores 22 may be tapered, as at 31 (Figure 8), so that when the pins are projected toward the plate 13 to cause the ends to engage in the bores 22 the portions 30 and 31 serve to guide the pins into the bores 22 with a positive engaging action.

According to the present invention, the mechanism for controllably shifting all of the clutch pins 20 comprises means that occupies generally the same axial length of the crank shaft that the pins 20 themselves occupy. To this end, the inner end of each clutch pin 20 is provided with a transverse recess 35 in which the inner end 36 of a screw-threaded pin 37 is disposed, the end 36 extending through an axially disposed slot 38 extending from the exterior surface of the cylindrical collar portion 15 of the crank shaft to the axially directed bores 21 receiving the clutch pins 20. The pins 37 are, in turn, carried in the flange portion 40 of a shiftable clutch sleeve 41 which is disposed for sliding movement on the exterior surface of the cylindrical collar section 15. A plurality of springs 45 are disposed at equally spaced intervals about the axis of the crank shaft 2, and each spring has one end seated in a recess 46 formed in the flange portion 16 of the crank shaft, while the other end is seated in a recess 47 formed in the flange portion 40 of the shiftable clutch sleeve 41. Thus, the effect of the springs 45 is to act through the shiftable clutch sleeve 41 to urge all of the clutch pins 20 for movement toward the driving flywheel 8, as will be apparent from Figure 1. It will also be seen that the pins 37 coact with the pins 20 and the slots and prevent rotation of the sleeve 41 on the crank shaft, thus eliminating splines, keys, and the like.

The shifting movements of the sleeve 41 may be controlled in any suitable manner, but preferably the trip mechanism shown in Figure 3 is employed in connection with suitable cam means formed on the shiftable clutch sleeve 41. Referring first to Figure 1, the flange portion 40 of the sleeve 41 is provided with a tapering cam surface 50 and a generally radial dwell portion 51 which terminates in a stop lug 52 which extends generally axially.

The preferred form of trip mechanism, shown in Figure 3, comprises a bracket 60 fixed to the frame 1 of the press in any suitable manner and includes a vertically disposed cylindrical section 62 and an extended bracket portion 63. Mounted in the cylindrical portion 62 is a reciprocable plunger 64 carrying a roller 65 on a reduced end 66. A spring 67 is seated at its lower end in the bottom of the interior bore of the cylindrical portion 62 and, at its upper end, bears against a shoulder 68 formed on the plunger 64. The lower reduced end 69 of the plunger is bifurcated, as at 70 in Figure 1, and receives one member 74 of an operating link as indicated in its entirety by the reference numeral 75. This linkage includes a lever 76 having an inclined slot or opening 77 therein and provided with a notch 78 in which a pin 79, carried at the lower end of the link member 74, is disposed and which is held normally in position by a spring 80 fixed to the link 74 and to the lever 76. The latter is actuated by the usual press pedal by means including a link 81.

Normally the spring 67 acts to force the upper end of the plunger 64 in a position alongside the flange 40 (Figure 1) of the shiftable clutch sleeve 41, the roller 65 rolling along the axially outwardly facing surface of the flange 40, and the roller 65 may be withdrawn out of contact with the shiftable clutch sleeve 41 by stepping on the pedal and pulling down on the lever 76 through the link 81 (Figure 3).

In order to prevent the press from operating but one time, a lug 90 is carried on the crank shaft ring 17 or other part that rotates with the crank shaft and is so disposed as to engage a roller 91 carried at the upper end of a lever 92 that is pivoted at 93 on the bracket extension 63. The lower end 94 of the lever 92 is connected to an arm 96 having a pair of notches 97 formed therein. When the outer notch 97 is engaged in a pin 98 carried by the link 74, the press is arranged for intermittent operation. As will be obvious, when the plunger 64 is withdrawn from behind the flange 40, the springs 45 act to shift the clutch sleeve 41 outwardly and carry the pins 20 into engagement with the bores 22 formed on the flywheel plate 13, thereby immediately connecting the crank shaft and the driving flywheel, as shown in Figure 1. As the crank shaft is rotated by the rotation of the flywheel, the projection 90 comes into contact with the roller 91 and swings the lever 92 in a clockwise direction (Figure 3) about the point 93, the lower end 94 of the lever 92 acting through the arm 96 to move the lower end of the link 74 out of the notch 78 and into the inclined portion of the slot or opening 77. This movement of the pin 79 then permits the spring 67 to expand and elevate the plunger 64 to carry the roller 65 into a position alongside the flange 40. The continued rotation of the crank shaft then brings the cam section 50 of the flange 40 into engagement with the roller 65, so that as the crank shaft rotates, the clutch collar 41 is shifted toward the left (Figure 1) until the roller 65 rides onto the dwell portion or land 51 of the cam. By this time the clutch pins 20 have been withdrawn from the holes 22 in the flywheel plate 13, as indicated in Figure 2, so that the rotation of the crank shaft 2 is stopped practically immediately by the operation of the usual brake mechanism associated with the press. The parts remain in this position until the treadle of the press is again depressed and the plunger 64 withdrawn from behind the flange 40 to again permit the springs 45 to urge the pins 20 into the holes 22 in the flywheel. As many pins 20 may be employed as desired, and for convenience of illustration I have shown the clutch mechanism as provided with twelve pins. In this construction, therefore, after the plunger 64 has been withdrawn, the flywheel 8 can move no farther than one-twelfth of a revolution before driving engagement between the flywheel and the crank shaft of the press is effected, engagement of the pins in the holes 22 of the flywheel plate 13 being facilitated by virtue of the tapered surfaces 30 and 31 described above in connection with Figure 8.

As indicated in the drawings, the press is shown in a vertical position. However, there may be occasions when it is desired to incline the press, and as a result of the inclined position, especially if the brake is too free, there may be a tendency for the crank shaft and pitman to drop back from its extreme upper stroke. A press constructed according to the principles of the present invention is easily adjusted to correct this tendency, and such adjustment may be effected merely by removing the screws 37, shifting or rotating the cam sleeve 41 to such a position that the sleeve 41 disengages the clutch at the proper time to prevent any tendency for the crank shaft and pitman to move in either direction, and then replacing and tightening the screws 37. It will be seen that this adjustment can be performed simply and easily and without removing the flywheel or any parts except the ring 17.

When it is required that the dies or other operating members of the press be adjusted, replaced, or exchanged, it is very desirable to have some means for positively locking the press clutch in its disengaged position so that there is no possibility of the clutch inadvertently engaging when the operator has his hands in the press. One mechanism that I have provided for this purpose is best shown in Figures 5, 6, and 7. At some portion of the flange 40 of the clutch sleeve 41 between the springs 45, I provide a threaded recess 100 in which a tubular bushing 101 is fixed. The flange 16 of the crank shaft is recessed, as at 102, to receive the head 103 of a locking pin 104, the inner end of which carries a washer 105, and between the washer and the head of the bushing 101 is a spring 106 that normally holds the pin 104 in a retracted position relative to the slidable clutch sleeve 41 and with the washer 105 against the bottom of the threaded recess 100 (Figure 5). However, the locking pin 104 moves axially as the clutch sleeve 41 is shifted, but the locking pin 104 is so disposed that the head 103 thereof may be turned crosswise (Figure 7) after the pin 104 has been pulled outwardly a small distance so as to permit the head 103 to clear the edges of a counterbore 108 formed about the recess 102. Since normally the head 103 does not extend beyond the edge of the recess 102, there is no danger that the locking pin 104 will inadvertently become engaged to hold the clutch disengaged when it is not desired that this shall occur, but when the head 103 is manually moved from the dotted line position (Figure 6) to the full line position, it can be turned crosswise (Figure 7) and will lock the clutch disengaged entirely irrespective of whether or not the plunger 64 should inadvertently be withdrawn.

Figure 9 illustrates a slightly modified form of latch or lock for the clutch of the press. In this form a locking pin 110 is provided with an end 111 bent at a right angle to the main body of the pin. The inner end of the latter carries a washer 112, which may be of substantially the same construction as shown in Figures 5 and 6 and described above. A spring 113 surrounds the inner end of the pin 110, and at its inner end bears against the washer 112 and at its outer end bears against a tubular screw-threaded bushing 115, which is screwed into a tapped opening in the flange 40 of the clutch sleeve 41 in the manner described above in connection with Figures 5 and 6. The ring 17, which is fixed in any suitable manner to the flange 16 of the crank shaft 2, is provided with a notch 116, and similarly a notch 117 is formed in the flange 16 of the crank shaft to receive the bent end of the latch pin 110.

Figure 9 shows the parts in the position they occupy when the clutch is disengaged, and if, while the clutch is in disengaged position, the pin 110 is moved outwardly a small amount against the bias of the spring 113 and the end 111 then turned out of the notch 116, the clutch sleeve 41 will be held disengaged. This latch, like the latch shown in Figures 5 and 6 and described above, constitutes a safety lock for the purpose of positively holding the press against operation until the pin 110 is turned back to the position shown in Figure 9. The notch 116 and slot 117 are proportioned to permit the pin to take a position farther to the right than is shown in Figure 9, when the clutch is engaged.

Figures 10, 11 and 12 illustrate another modified form of the present invention. In a number of details, however, the features described above have been incorporated and hence the same reference numerals have been employed. Referring now to Figures 10, 11 and 12, a bracket 131 is secured to the frame of the press and supports a tubular sleeve section 132 which, at its lower end, is split at 133 and is provided with a pair of apertured lugs 134 and 135. A cap screw 137 is threaded into the lug 134 and is loosely received in the other lug 135. A clutch actuating plunger 140 carrying a roller 141 at its upper end is mounted for vertical reciprocation in the sleeve 132. In this form of the invention the clutch pins are connected to a shiftable clutch sleeve 145, which is substantially of the same construction as described above in connection with the clutch sleeve 41 in Figure 1, except that the clutch sleeve 145 is provided with a cam section 146 which, unlike the construction described above, is not integral with the clutch sleeve 145 but is separate therefrom and secured thereto in any suitable manner, such as rivets 147. If desired, screws or other fastening means may be employed. The particular advantage of having the cam 146 separate from the sleeve 145 is that, since in operation the cam is subjected to greater wear than the other parts, the cam when worn can be replaced without requiring an entire new sleeve. If fastened by screws or the like, the cam plate 146 may be removed and replaced without having to remove any other part from the press. Also, more than one set of holes may be provided in the clutch sleeve 145 to receive the rivets, screws, or other fastening means, whereby the cam section 146 may be moved to different positions on the sleeve without dismantling any portion of the press. In this way, for example, the press may be readily adapted to operate in a reclined position in such a way that there is no tendency for the crank shaft and pitman to drop back from their upper position, thereby eliminating any necessity for removing the screws 37 and shifting the sleeve 41 as a whole about the crank shaft as described above.

The plunger 140 and roller 141 control the position of the clutch in the manner described above in connection with Figures 1 to 3; that is, when the plunger is withdrawn the springs force the pins 20 into driving engagement with the holes in the flywheel plate 13, and when the plunger 140 is released, it occupies a position shown in Figures 10 and 11, so that the continued rotation of the crank shaft and the clutch sleeve will cause the cam section 146 to be brought against the roller 141 which thereupon shifts the clutch sleeve 145 to the left, withdrawing the driving pins out of engagement with the driving flywheel. The mechanism I have shown in Figures 10, 11 and 12, for actuating the plunger 140, embodies certain improvements over the mechanism shown in Figure 3, and my modified control mechanism will now be described.

The lower end of the plunger 140 has a reduced stem 150 which passes through an adjusting bushing 151 threaded into the lower end of the sleeve 132. The inner end of the bushing 151 is recessed, as at 152, and receives the lower end of the spring 154, the upper end of which bears against the shoulder between the stem 150 and the adjacent portion of the plunger 140. As will be clear from Figure 10, the spring 154 normally biases the plunger 140 for movement upwardly, and by turning the bushing 151 inwardly or outwardly, after first loosening the clamping screw 137, the effective force exerted by the spring 154 on the plunger 140 is adjusted. After the desired adjustment is attained, the clamping screw 137 may be tightened to retain the adjustment.

A pair of links 161 and 162 are connected by a pivot pin 163 to the lower end of the stem 150, and the lower ends of the links 161 and 162 are connected by a pivot 164 to the outer end of a lever 165. The latter is mounted for pivotal movement about a stud 167 carried by the frame of the press, and intermediate its ends the lever 165 is provided with a notch 168, one edge 169 of which is inclined as indicated in Figure 10, and adjacent the inclined edge 169 is a dwell portion 170. The lever 165 carries a stop pin 172 against which a yoke 173 is held by a spring 174. One end of the spring 174 is anchored to the yoke 173, as at 177, and the other end of the spring 174 is connected by a pin 178 to the lever 165. An apertured lug 179 is carried at the lower end of the yoke 173 and receives the upper end of a swingable rod 181 which is held in place in the lug 179 by a set screw 182. The usual operator-actuated pedal is connected to exert a downward pull through the rod 181 on the lever 165 to withdraw the plunger 140 against the bias of the spring 154 and release the clutch sleeve 41 to permit the clutch to be engaged.

The yoke 173 has two sections 173a and 173b disposed on opposite sides of the lever 165, and a roller 185 is carried on a pin 186 between the two sections at the upper end of the yoke 173. The roller 185 bears against the edge 170 of the lever adjacent the inclined portion 169. The upper portions of the yoke sections 173a and 173b are apertured, as at 190, and receive a trunnion 191 in which the screw-threaded portion 192 of a link 193 is disposed. A pair of lock nuts 194 and 195 are disposed on opposite sides of the trunnion 191 and hold the link 193 in adjusted position therein.

The end of the link opposite the threaded portion 192 is provided with a pair of recesses 196 and 197, and this end of the link 193 is received between the two arms of the lower bifurcated end 198 of a lever 200 which is pivotally mounted on a stud 201 carried by the bracket 131. The lever 200 has a bifurcated upper end 202 between the two sections of which a roller 203 is disposed. Preferably the roller is mounted on a pin 204. A pin 210 is carried at the lower end 198 of the lever 200, and a socket 211 is provided in the lever end 198 in which a spring 212 is disposed, the lower end of which bears against a plunger 213 which, in turn, bears against the upper edge of the link 193 for the purpose of holding either the notch 196 or the notch 197 against the pin 210. A cam 215 is disposed on the ring 17 (Figure 10) and cooperates with the roller 203 to actuate the lever 200.

When the press is stopped, the parts normally occupy the positions shown in Figure 10, the roller 141 having acted against the cam 146 to withdraw the clutch pins from the driving flywheel. If it is desired to start the press, the operator depresses the pedal which pulls down on the link 181. Since the roller 185 bears against the dwell portion 170 of the lever 165, the downward movement of the link 181 swings the lever 165 about its axis, at 167, and thereby pulls the plunger 140 downwardly against the bias of the spring 154. As soon as the roller 141 moves below the flange on the sleeve 145, the springs 45 (Figure 12) act to project the sleeve 145 and the associated pins 20 toward the right and into engagement with the flywheel. The crank shaft is then rotated in the direction of the arrow shown in Figure 12 until the cam 215 comes into engagement with the roller 203, as indicated in dotted lines in Figure 10. Thereupon the continued rotation of the crank shaft and flywheel causes the cam 215 to act against the lever 200 and rock the same in a clockwise direction about its pivot 201. The lower end of the lever 200 thereupon exerts a pull through the link 193, which swings the link 181 and shifts the yoke 173 at the upper end thereof toward the left (Figure 10) until the roller 185 enters the notch 168. As soon as the roller 185 moves onto the inclined portion 169, the spring 154 acts against the plunger 140 and raises the latter as the yoke 173 is pulled to the left, until the roller 185 rests in a position in the bottom of the notch 168. At this time the plunger roller 141 is in a position to reengage the cam plate 146 as the crank shaft continues to turn, whereupon the sleeve 145 will be forced toward the left (Figure 12), thus disengaging the clutch of the press.

It will be noted that the press can make but one revolution even though the operator should not release the pedal to which the lower end of the link 181 is connected. If it should be desired, however, to arrange the press for continuous operation, in which the press continues to operate as long as the link 181 is held down, all that it is necessary to do is to raise the link 193 in the bifurcated end 198 against the spring-biased detent plunger 213 and engage the notch 196 over the pin 210. This results in swinging the arm 200 away from the cam 215 so that this part of the press remains inoperative and the clutch will be engaged as long as the pedal and link 181 are held down by the operator.

While I have shown and described above the preferred structural embodiment of my invention, it is to be understood that my invention is not to be limited to the specific details shown and described above, but that, in fact, widely different means may be employed in the practice of the broader aspects of my invention.

What I claim, therefore, and desire to secure by Letters Patent is:

1. In a press, a frame, a crank shaft journaled for rotation therein and extending therefrom at one end, means on the crank shaft providing a peripheral series of axially extending through holes, a flywheel journaled for rotation on the extended end of the crank shaft, a plurality of pins carried for axial sliding movement in said through holes between the frame and the flywheel and shiftable into engagement with the latter for connecting the flywheel to the crank shaft, a shift collar disposed about said pins and occupying a position in a plane between the ends thereof so as to reduce the overhang required between said frame and said flywheel, there being slots in the crank shaft radially outwardly of said through holes, and means also between the ends of the pins and including parts extending radially inwardly through said slots to connect said collar with said pins for sliding all of them toward and away from said flywheel.

2. In a press, a frame, a crank shaft journaled for rotation therein and including a flanged portion disposed outwardly of the frame and a bearing receiving portion of reduced diameter disposed outwardly of said flanged portion, a driving wheel, bearing means mounting the driving wheel for rotation on the reduced portion of the crank shaft, there being a plurality of pin receiving openings in the hub of the driving wheel facing said flanged portion of the crank shaft and there being a plurality of axially directed circumferentially spaced bores formed in said flanged portion radially inwardly of the periphery of the latter and capable of being axially aligned with said openings, generally axially extending slots formed in the periphery of said flanged portion and communicating, respectively, with said bores, a plurality of sliding pins disposed in said bores, said pins being slidable in said bores and into engagement in said openings for operatively connecting the driving wheel to the crank shaft, and shifting mechanism disposed substantially in between the axial dimension of said pins and including parts extending through said slots into engagement with said pins.

3. In a press, a crank shaft having a reduced outer end, a driving flywheel journaled for rotation on the reduced end of said crank shaft, a clutch plate secured to the hub of the flywheel on the inner face thereof and having a plurality of drilled holes therein in uniform peripheral spacing, a plurality of axially directed bores drilled in the crank shaft in spaced relation corresponding to the spacing of said holes in said clutch plate and adapted to be aligned therewith, a plurality of clutch pins disposed in said bores and adapted to be projected into the drilled holes in said clutch plate for operatively connecting the crank shaft to said driving flywheel, there being slots extending from the periphery of the drilled portion of the crank shaft radially inwardly into communication with said axially directed bores therein, a sleeve disposed exteriorly about the portion of the crank shaft having said drilled bores, means extending through said slots to connect said clutch pins to said sleeve, and mechanism for shifting said sleeve to connect and disconnect the driving flywheel.

4. In a press, a crank shaft having a reduced end and an enlarged flanged portion adjacent thereto, there being a plurality of drilled bores in said flanged portion disposed axially and opening outwardly adjacent the reduced end of the crank shaft, a driving flywheel journaled for rotation on said reduced crank shaft end and provided with sockets adapted to register with the drilled bores in the crank shaft, there being a radially outwardly extending opening in said crank shaft communicating with the inner end of each of said drilled bores, a plurality of slidable clutch pins disposed in said drilled bores and adapted to be shifted into the sockets and the flywheel connecting the latter to the crank shaft, an operating pin extending radially inwardly through the radially directed opening for each bore and operatively connected with the inner end of the slidable clutch pin disposed therein, a shift ring mounted on the periphery of said flanged portion of the crank shaft and receiving said pins whereby axial movement of said shift ring shifts all of said clutch pins, spring means acting against said crank shaft and engaging said shift ring to force said slidable clutch pins toward the driving flywheel to engage the sockets of the latter, and shift means acting against said shift ring for withdrawing all of said pins out of engagement with said sockets.

5. In a press, a frame, a crank shaft journaled for rotation therein and extending therefrom at one end, said extended portion of the crank shaft including a radially outwardly extending flange and a bearing receiving portion of reduced diameter disposed outwardly of said flanged portion, roller bearings on said bearing receiving portion, a driving flywheel mounted on said roller bearings, there being a plurality of pin receiving openings in the hub of the driving flywheel facing said flanged portion of the crank shaft and there being a plurality of axially directed bores formed in peripherally spaced relation in and radially inwardly of the periphery of said flanged portion, a plurality of sliding pins disposed in said bores, there being a plurality of generally radially inwardly directed openings extending from the periphery of said flanged portion into communication, respectively, with said axially directed bores, a shift collar, connections extending through said openings to connect said shift collar, with said pins for sliding them toward and away from said flywheel for operatively engaging and disengaging the crank shaft from said driving flywheel, said shift collar being held by said pins and connections against rotation relative to said crank shaft, and cam means associated with said collar for shifting the latter and said pins.

6. In a press, a frame, a crank shaft journaled for rotation therein and extending therefrom at one end, a flywheel journaled for rotation on the extended end of the crank shaft, clutch mechanism for connecting the flywheel with said crank shaft to drive the latter, said clutch mechanism including a part shiftable on the crank shaft toward and away from said flywheel, and latch means carried by said shiftable part and extending into a position to engage said crank shaft for locking the clutch mechanism in its disengaged position.

7. In a press, a crank shaft journaled for rotation therein and including a flanged portion, clutch mechanism associated with said crank shaft and including a shiftable sleeve, a spring pressed pin carried by said shiftable sleeve and movable therewith relative to said crank shaft, the flanged portion of the latter having an opening receiving said pin, and a part on said pin adapted to be turned into engagement with the crank shaft for holding said shiftable clutch part against shifting movement.

8. In a press having a rotatable crank shaft and a driving flywheel mounted for rotation on said crank shaft, the combination of clutch mechanism for connecting said flywheel with said crank shaft and including an axially shiftable member mounted on the crank shaft, the latter having a flange adjacent said shiftable clutch member and provided with an opening therein, a spring biased latch carried by said clutch member and including a portion movable with the member and extending into said opening, and means for moving said clutch member into retracted position adjacent said flange, said latch member being movable so as to engage the crank shaft flange and lock the clutch member in its retracted position.

9. In a press, a frame, a crank shaft journaled for rotation therein and extending therefrom at one end, said extended portion of the crank shaft including a radially outwardly extending flange and a bearing receiving portion of reduced diameter disposed outwardly of said flanged portion, a driving flywheel mounted on said bearing receiving portion for rotation thereon, there being a plurality of pin receiving openings in the hub of the driving flywheel facing said flanged portion of the crank shaft and there being a plurality of axially directed bores formed in peripherally spaced relation in said flanged portion, a plurality of sliding pins disposed in said bores, a shift collar operatively connected with said pins for sliding them toward and away from said flywheel for operatively engaging and disengaging the crank shaft from said driving flywheel, said shift collar being held against rotation relative to said crank shaft, and a headed spring-biased latch carried by said shift collar and movable with the latter relative to said crank shaft, the latter having an opening receiving the headed end of said latch in such relation that the latter can be locked to the crank shaft for locking the collar in that position.

10. In a press, a frame, a crank shaft journaled for rotation therein and extending therefrom at one end, a flywheel journaled for rotation on the extended end of the crank shaft, a plurality of pins carried for axial sliding movement on said crank shaft between the frame and the flywheel and shiftable into engagement with the latter for connecting the flywheel to the crank shaft, a cam sleeve disposed about said pins, means detachably connecting said sleeve to said pins and operatively connecting said sleeve therewith for sliding all of the pins toward and away from said flywheel, and a control member operatively associated with said cam sleeve for shifting the same axially, said detachable connecting means between said sleeve and pins providing for the adjustment of the cam sleeve to cause the crank shaft to stop in different positions.

11. Non-repeat clutch control mechanism for a press or the like, comprising clutch controlling means biased for movement to a clutch releasing position, a movably mounted part having an opening therein, means for actuating said clutch controlling means through said part, including an adjustable member engaging said part adjacent the opening therein, a movable member responsive to the operation of the press, and a link connected at one end to one of said members and having notches releasably engaging cooperating parts on the other member, whereby the position of the link relative to the latter determines whether or not the operation of the press will automatically shift said other member into said opening and move said clutch controlling means into its clutch disengaging position.

12. Non-repeat clutch control mechanism for a press or the like, comprising a clutch controlling member biased for movement into a clutch releasing position, a pivotally mounted lever separate from said clutch controlling member and having an opening therein, swingable link means connecting said lever adjacent said opening with said clutch controlling member, and means responsive to the operation of the press for automatically shifting said link means into said opening to provide for disengaging movement of said clutch controlling member.

13. Non-repeat clutch control mechanism as defined in claim 11, further characterized by a separate connection between the clutch controlling means and said movably mounted part, the notched portion of said link being connected to the member that is responsive to the operation of the press, and means carried by said last mentioned member for holding said link in either of its positions relative thereto.

14. In a press clutch, a shiftable clutch part, a second part on which said first part is shiftable and with respect to which the first is held against rotation thereon, a spring biased latch pin carried by one of said parts and extending into an opening in the other part, and means on said spring biased pin adapted to engage said other clutch part for holding said parts in one position.

15. In a press clutch, a shiftable clutch part, a second part on which said first part is shiftable and with respect to which the first is held against rotation thereon, and a spring biased latch pin carried by one of said parts and extending into an opening in the other part, said latch pin having its outer end turned at a right angle and extending radially beyond said other part, said pin being adapted to be moved against said biasing spring and turned to engage its outer end with said other part to hold said parts in their clutch disengaging position.

16. In a punch press clutch including a flanged crank shaft and a shiftable clutch collar mounted thereon and provided with a flange adjacent the flange on the crank shaft, a spring-biased latch pin carried on one of said flanges and extending into an opening in the other flange, and a head carried by said latch pin, said head and the opening in said other flange receiving the head being non-circular to provide for shifting the latch pin against said spring bias and turning the same to latch said flanges together to hold the clutch in one of its positions.

17. In a press, a frame, a crank shaft journaled for rotation therein and extending therefrom at one end, a flywheel journaled for rotation on the extended end of the crank shaft, clutch mechanism for connecting the flywheel with said crank shaft to drive the latter, said clutch mechanism including a part shiftable on the crank shaft toward and away from said flywheel, and latch means acting between said crank shaft and shiftable part, being carried by one and engageable with the other, for holding said shiftable part against movement relative to the crank shaft so as to lock the clutch mechanism in its disengaged position.

JAMES E. LOSHBOUGH.